(12) United States Patent
Oshidari

(10) Patent No.: US 6,659,906 B2
(45) Date of Patent: Dec. 9, 2003

(54) TOROIDAL CONTINUOUSLY VARIABLE TRANSMISSION

(75) Inventor: Toshikazu Oshidari, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 69 days.

(21) Appl. No.: 10/114,208

(22) Filed: Apr. 3, 2002

(65) Prior Publication Data

US 2002/0169051 A1 Nov. 14, 2002

(30) Foreign Application Priority Data

May 8, 2001 (JP) ........................................ 2001-136858

(51) Int. Cl.[7] ............................................. F16H 61/30
(52) U.S. Cl. ................................ 476/10; 476/9; 477/37
(58) Field of Search ............................. 476/9, 10, 2, 3; 477/37, 38

(56) References Cited

U.S. PATENT DOCUMENTS 5,935,039 A * 8/1999 Sakai et al. .................... 476/10

6,159,126 A   12/2000 Oshidari

FOREIGN PATENT DOCUMENTS

| EP | 0 967 413 | 12/1999 |
|---|---|---|
| JP | 11-94062 | 4/1999 |
| JP | 11-182648 | 7/1999 |

* cited by examiner

Primary Examiner—David Fenstermacher
(74) Attorney, Agent, or Firm—Foely & Lardner

(57) ABSTRACT

In a toroidal continuously variable transmission, a secondary oil pump is provided in addition to a primary oil pump driven by an engine. The secondary oil pump is driven in response to rotation of a road wheel. A hydraulic servo mechanism is connected to a trunnion to create an offset of the power roller from a neutral position for a tilting motion of the power roller. A feedback device is provided for feeding a degree of progress for ratio changing back to the hydraulic servo mechanism so that the power roller returns to the neutral position when a desired transmission ratio has been reached. When the road wheel is rotated in a stopped state of the engine, hydraulic pressure from the secondary oil pump is supplied to the hydraulic servo mechanism so that an actual transmission ratio is brought closer to a desired transmission ratio.

18 Claims, 4 Drawing Sheets

TOROIDAL CONTINUOUSLY VARIABLE TRANSMISSION

TECHNICAL FIELD

The present invention relates to a toroidal continuously variable transmission for a vehicle.

BACKGROUND ART

In recent years, to meet demands for increased shift comfort, improved driveability, and reduced fuel consumption and exhaust emissions, there have been proposed and developed toroidal continuously variable transmissions often abbreviated to "toroidal CVT", in which a transmission ratio is steplessly variable within limits. On such toroidal CVTs, engine power (torque) is transmitted from an input disk to an output disk via a traction oil film formed between a power roller and each of the input and output disks, using a shearing force in the traction oil film at high contact pressure. The input and output disks coaxially oppose each other. The toroidal CVT has a trunnion serving as a power roller support that rotatably supports the power roller, which is interposed between the input and output disks and is in contact with a torus surface of each of the input and output disks under preload. During transmission-ratio changing, in order to obtain a desired transmission ratio determined based on the magnitude of a gyration angle of the power roller, first of all, the power roller is shifted or displaced from a neutral position at which a rotation axis of the power roller intersects the center of rotation (rotation axis) of the input and output disks by slightly shifting the trunnion in a direction of a trunnion axis perpendicular to the rotation axis of the power roller via a hydraulic servo mechanism that operates in response to a hydraulic pressure generated by an oil pump. Usually, the oil pump is constantly driven by a prime mover (an engine) during operation of the prime mover. By virtue of a side slip force occurring in a very limited contact zone between the power roller and the input and output disks due to the slight offset (the slight vertical displacement of the power roller), the power roller is self-tilted or self-inclined. Owing to the self-inclining motion of the power roller, a first diameter of a circular-arc shaped locus drawn by movement of the very limited contact point between the power roller and the output disk on the torus surface of the output disk and a second diameter of a circular-arc shaped locus drawn by movement of the very limited contact point between the power roller and the input disk on the torus surface of the input disk, that is, a ratio of the first diameter to the second diameter can be continuously varied, thus continuously varying a transmission ratio. On the other hand, in the toroidal CVT, a degree of progress for transmission-ratio changing is fed back to the hydraulic servo mechanism, so that the trunnion gradually returns to its initial position as the transmission-ratio changing progresses. When the gyration angle based on a desired transmission ratio corresponding to a transmission-ratio command signal value has been reached, the vertical displacement of the trunnion is returned to zero, so as to terminate the inclining motion of the power roller, and to attain the return of the power roller to neutral, and thus to maintain the desired transmission ratio corresponding to the ratio command signal value.

In the prime-mover driven oil pump as discussed above, pressurized working fluid (pressurized traction oil) is continuously discharged from the oil pump during operation of the prime mover. Therefore, during the operation of the prime mover, the hydraulic servo mechanism is controllable by way of hydraulic pressure produced by the oil pump having a driven connection with the prime mover. Suppose that torque backwardly flows from road wheels to the output disk owing to hauling or coasting in a stopped state of the prime mover in which there is no hydraulic pressure produced by the oil pump for the purpose of ratio control. In this case, the hydraulic servo mechanism is in an uncontrolled state, and therefore there is an increased tendency for the toroidal CVT to undesirably shift up, for the reasons discussed below.

When the output disk is driven by road wheels due to back-flow of torque from the road wheels to the output disk, as a push-back force (a reaction force) from a contact portion between the power roller and the input shaft, the power roller, which is interposed between the input and output disks under preload, receives a component force acting in the trunnion-axis direction. This causes a slight offset of the power roller from the neutral position in the trunnion-axis direction. Owing to self-inclining motion of the power roller, an upshift of the toroidal CVT to a higher transmission ratio occurs undesirably.

If the prime mover is restarted and the vehicle is accelerated from standstill on the assumption that the toroidal CVT has been undesirably up-shifted to a high transmission ratio owing to hauling or coasting in the stopped state of the primer mover, there are the following drawbacks.

During the early stages of vehicle starting, a desired transmission ratio corresponding to a transmission-ratio command signal is generally set at a predetermined lowest ratio. Just before restarting the vehicle, there is no torque transmission, and thus the vehicle is restarted at the transmission ratio remaining high on the assumption discussed above. This is often called as a "high-ratio starting". During the so-called high-ratio starting, as a matter of course, there is a lack in torque, thus deteriorating the starting performance of the vehicle. To avoid this, Japanese Patent Provisional Publication No. 2000-9197 (corresponding to U.S. Pat. No. 6,159,126) teaches the use of a biasing device such as a return spring that biases a trunnion in one axial direction of the trunnion axis. In the toroidal CVT described in the U.S. Pat. No. 6,159,126, the spring bias of the return spring prevents an undesired offset of the power roller from its neutral position even when rotation of the road wheels in one rotational direction (either a forward-rotational direction or a reverse-rotational direction) occurs after the prime mover (the engine) has stopped. In this case, a rotational direction of the road wheels in which the spring bias acts is either of the forward-rotational direction and the reverse-rotational direction. It is desirable to prevent the so-called "high-ratio starting" irrespective of whether the road wheels are rotated in the forward-rotational direction or in the reverse-rotational direction.

SUMMARY OF THE INVENTION

Accordingly, it is an object of the invention to provide a toroidal continuously variable transmission, which avoids the aforementioned disadvantages.

In order to accomplish the aforementioned and other objects of the present invention, a toroidal continuously variable transmission comprises a toroidal continuously variable transmission comprises an input disk to which rotation of a prime mover is transmitted, an output disk coaxially arranged with and opposed to the input disk, the output disk adapted to have a driving connection with and to have a driven connection with a road wheel, a power roller interposed between the input and output disks under axial preload for power transmission, a trunnion rotatably supporting the power roller to permit a tilting motion of the power roller about a trunnion axis perpendicular to a rotation axis of the power roller for ratio changing, a primary oil pump driven by the prime mover to produce a hydraulic pressure, a secondary oil pump driven in response to rotation of the road wheel to produce a hydraulic pressure, a hydraulic servo mechanism connected to the trunnion to move the trunnion in a direction of the trunnion axis so as to cause the tilting motion of the power roller by creating an offset of the power roller from a neutral position in the direction of the trunnion axis, the neutral position being a non-ratio-changing position at which the rotation axis of the power roller intersects a rotation axis of the input and output disks, a feedback device through which a degree of progress for ratio changing is fed back to the hydraulic servo mechanism so that the power roller returns to the neutral position when a desired transmission ratio has been reached, the hydraulic servo mechanism hydraulically operated by at least one of the hydraulic pressure from the primary oil pump and the hydraulic pressure from the secondary oil pump, and a hydraulic circuit that supplies the hydraulic pressure from the secondary oil pump to the hydraulic servo mechanism when the road wheel is rotated in a stopped state of the prime mover, so that an actual transmission ratio is brought closer to the desired transmission ratio.

The other objects and features of this invention will become understood from the following description with reference to the accompanying drawings.

DESCRIPTION OF THE PREFERRED EMBODIMENTS

Figure 1:
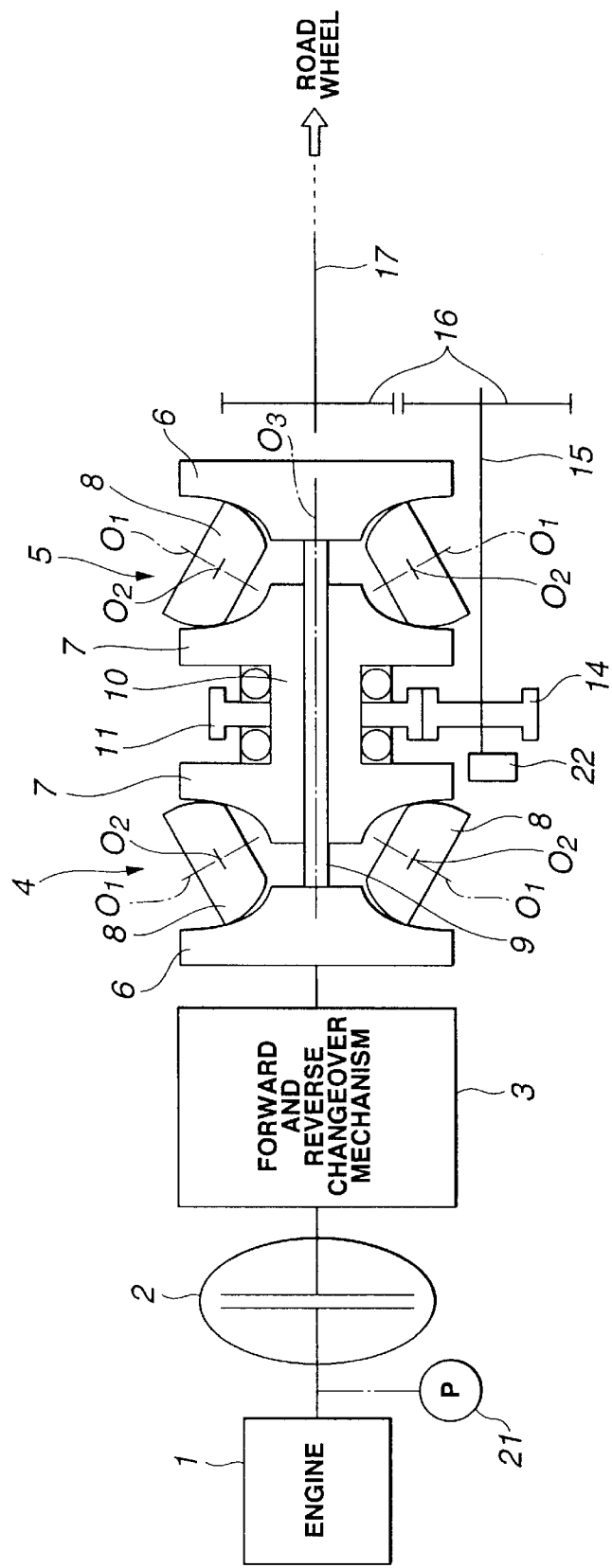
FIG. 1 is a system diagram illustrating an embodiment of a toroidal continuously variable transmission.
Figure 4:
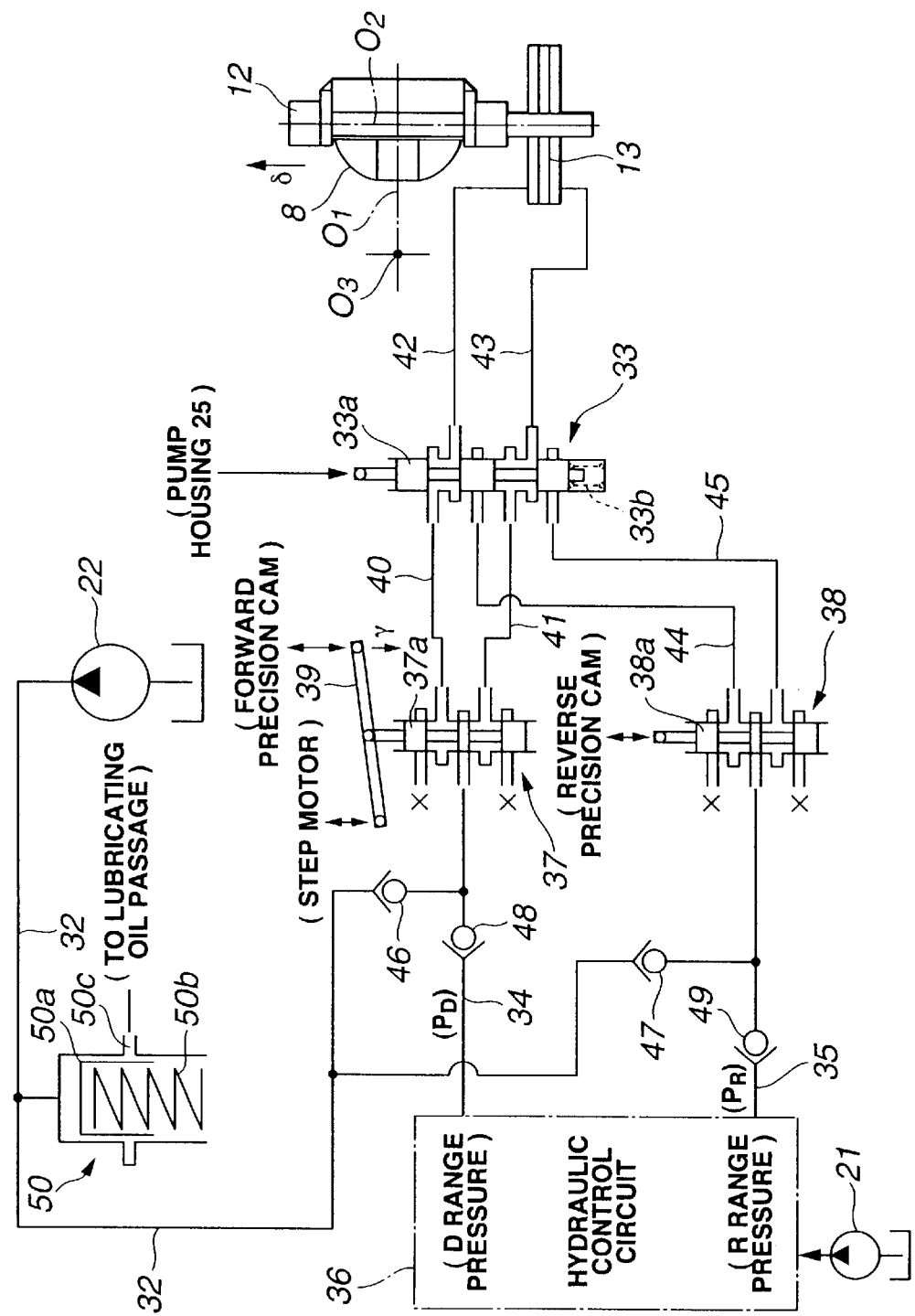
FIG. 4 is a hydraulic circuit diagram of a hydraulic control system for transmission-ratio changing control in the toroidal CVT of the embodiment.

Referring now to the drawings, particularly to FIG. 1, a toroidal continuously variable transmission (toroidal CVT) of the embodiment is exemplified in a half-toroidal continuously variable transmission combined with a lock-up torque converter 2. In the power train for the toroidal CVT of the embodiment shown in FIG. 1, engine torque (driving torque) is transmitted from an engine 1 (serving as a prime mover) via lock-up torque converter 2 to a forward and reverse changeover mechanism 3. Forward and reverse changeover mechanism (F/R changeover mechanism) 3 functions to transmit input rotation to an input shaft or an input disk of the toroidal CVT without changing a direction of rotation in a drive range (D range) of a forward running mode. F/R changeover mechanism 3 also functions to transmit input rotation to the toroidal CVT input shaft while changing a direction of the input rotation in a reverse range (R range). That is, F/R changeover mechanism 3 reversibly transmits the input rotation of the prime mover to the input disk. F/R changeover mechanism 3 further functions to shut off power transmission to the toroidal CVT input shaft in a parking range (P range) or a neutral range (N range). F/R changeover mechanism 3 is generally comprised of a planetary gearset, a forward clutch, and a reverse brake. At the subsequent stage of the F/R changeover mechanism, a front toroidal CVT mechanism (or a first variator unit) 4 and a rear toroidal CVT mechanism (or a second variator unit) 5 are set in tandem and coaxially arranged in the interior space of the toroidal CVT casing. Such an arrangement of the two variators is often called as a "dual cavity type toroidal CVT". First and second toroidal CVT mechanisms 4 and 5 have the same in construction. First toroidal CVT mechanism 4 is comprised of a pair of input and output disks 6 and 7 coaxially arranged and opposing each other, a pair of power rollers (8, 8), a power roller support or a trunnion (described later), and a servo piston serving as a hydraulic actuator (described later). Each of input and output disks 6 and 7 has a torus surface. Power rollers (8, 8) are interposed between input and output disks 6 and 7 such that power rollers (8, 8) are in contact with the torus surfaces of the input and output disks under axial preload. Power rollers (8, 8) are symmetrically arranged to each other with respect to a main torque transmission shaft 9. First and second CVT mechanisms 4 and 5 are arranged in reverse to each other on main torque transmission shaft 9 such that the output disk included in first toroidal CVT mechanism 4 and the output disk included in second toroidal CVT mechanism 5 are opposed to each other with respect to an output gear 11 fixedly connected onto a cylindrical hollow output shaft 10. Although it is not clearly shown in FIG. 1, of the two input disks, the input disk of first toroidal CVT mechanism 4 is preloaded axially rightwards (viewing FIG. 1) by means of a loading cam device (not shown). The loading cam device is designed to produce a magnitude of the axial preload substantially proportional to input torque transmitted from lock-up torque converter 2 via F/R changeover mechanism 3 to the toroidal CVT input shaft. On the other hand, the input disk of second toroidal CVT mechanism 5 is permanently biased axially leftwards (viewing FIG. 1) by way of a spring bias. Each of input disks (6, 6) is supported on main torque transmission shaft 9 by way of ball-spline-engagement, so as to permit each of input disks (6, 6) to axially move relative to the main torque transmission shaft, and to rotate about the main torque transmission shaft. Output disks (7, 7) and cylindrical hollow output shaft 10 are integrally connected to each other or integrally formed with each other, and coaxially arranged with each other. Output disks (7, 7) are linked to output gear 11 via cylindrical hollow output shaft 10 by way of spline-engagement. In contrast to input disks (6, 6), each of output disks (7, 7) is axially stationary. Thus, output gear 11 is rotatable relative to main torque transmission shaft 9. As shown in FIG. 4, each of power rollers (8, 8, 8, 8) is supported on one end of each of trunnions (12, 12, 12, 12). Power rollers (8, 8, 8, 8) are rotatable about the respective power-roller rotation axes ($O_1$, $O_1$, $O_1$, $O_1$). Each of servo pistons (13, 13, 13, 13), serving as a hydraulic servo mechanism, is coaxially connected onto the other end of each of the trunnions, so as to tilt each of the power rollers by shifting trunnions (12, 12) of first toroidal CVT mechanism 4 in opposite directions of their trunnion axes perpendicular to the power-roller rotation axes and by shifting trunnions (12, 12) of second toroidal CVT mechanism 5 in opposite directions of their trunnion axes perpendicular to the power-roller rotation axes. That is, all of the trunnions are shifted in phase and synchronously with each other by means of the four servo pistons.

The ratio changing operation and power flow of the toroidal CVT of the embodiment are described hereunder.

Input rotation or input torque is transmitted from F/R changeover mechanism 3 simultaneously to both the two input disks (6, 6). The input torque is further transmitted from input disks (6, 6) to the respective power rollers, so as to cause rotation of each of the power rollers about its rotation axis $O_1$. Then, torque is transmitted from the power rollers via output disks (7, 7) to output gear 11 common to the two output disks. The torque is transmitted from output gear 11 to a counter gear 14 in meshed-engagement with output gear 11 and fixedly connected to a countershaft 15. The torque is further transmitted via a gearset 16 and a toroidal CVT output shaft 17 coupled to a propeller shaft (not numbered) to the drive wheels, in that order. During ratio changing, each of the power rollers is tilted or inclined so that the magnitude of a gyration angle based on a desired transmission ratio is attained. In accordance with a continuous change in the gyration angle, the torque is transmitted to each output disk while steplessly varying an input speed of each input disk. Concretely, during ratio changing, the power rollers are shifted from their neutral positions shown in FIGS. 1 and 4 in phase and in synchronization with each other in directions of trunnion axes ($O_2$, $O_2$, $O_2$, $O_2$) perpendicular to the power-roller rotation axes ($O_1$, $O_1$, $O_1$, $O_1$) through trunnions (12, 12, 12, 12) by means of the servo pistons (13, 13, 13, 13) (see FIG. 4). The neutral position corresponds to a non-ratio-changing position at which the power-roller rotation axis $O_1$ intersects a rotation axis $O_3$ of the input and output disks. Shifting the power rollers (8, 8, 8, 8) from their neutral positions causes an offset (a vertical displacement) of each of power-roller rotation axes ($O_1$, $O_1$, $O_1$, $O_1$) from the rotation axis $O_3$ of input and output disks 6 and 7. Owing to the offset or vertical displacement, a side slip force occurs in a very limited contact zone between each of the power rollers and the associated input and output disks. By virtue of the side slip forces, the power rollers can be self-tilted or self-inclined in phase and in synchronization about the respective trunnion axes ($O_2$, $O_2$, $O_2$, $O_2$). Owing to the self-inclining motion of each of the power rollers, a first diameter of a circular-arc shaped locus drawn by movement of the very limited contact point between each of the power rollers and the output disk on the torus surface of the output disk and a second diameter of a circular-arc shaped locus drawn by movement of the very limited contact point between each of the power rollers and the input disk on the torus surface of the input disk, that is, a ratio of the first diameter to the second diameter can be continuously varied, thus continuously varying a transmission ratio of the dual cavity type toroidal CVT. On the other hand, a degree of progress for transmission-ratio changing is mechanically fed back to the hydraulic servo mechanism, that is, servo pistons (13, 13, 13, 13) by means of a forward precision cam (described later) in the forward running mode and by means of a reverse precision cam (described later) in the reverse running mode, such that each of the trunnions gradually returns to its initial position as the ratio changing progresses or advances. As soon as the gyration angle based on the desired transmission ratio corresponding to a transmission-ratio command signal value has been reached, the offset or vertical displacement of each of the trunnions is returned to zero, so as to stop the inclining motion of each power roller, and to attain the return of each power roller to neutral, and thus to maintain the desired transmission ratio corresponding to the ratio command signal value.

Figure 2:
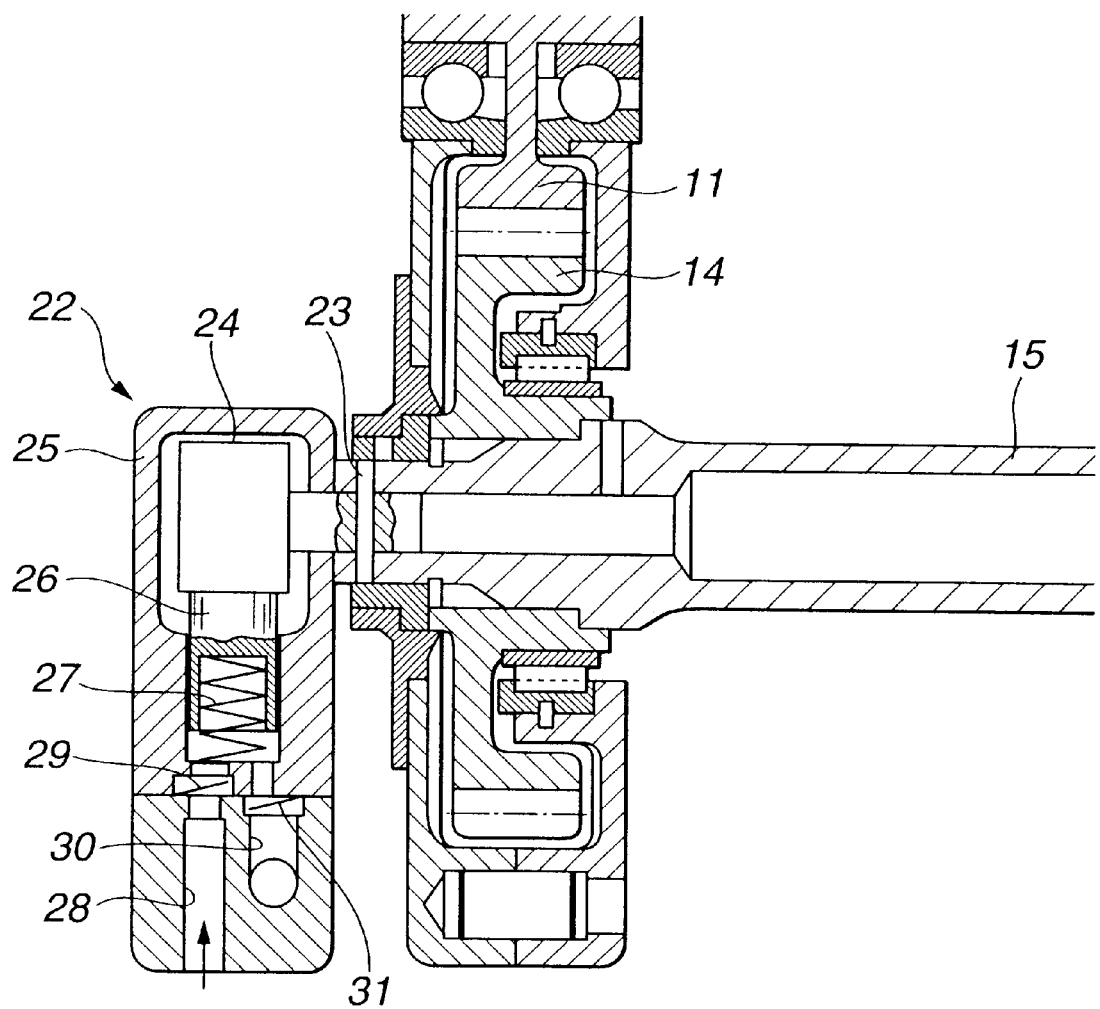
FIG. 2 is an enlarged longitudinal cross-sectional view illustrating an essential part of a secondary oil pump, incorporated within the toroidal CVT of the embodiment and driven in response to rotation transmitted from the road wheels to the transmission output shaft.
Figure 3:
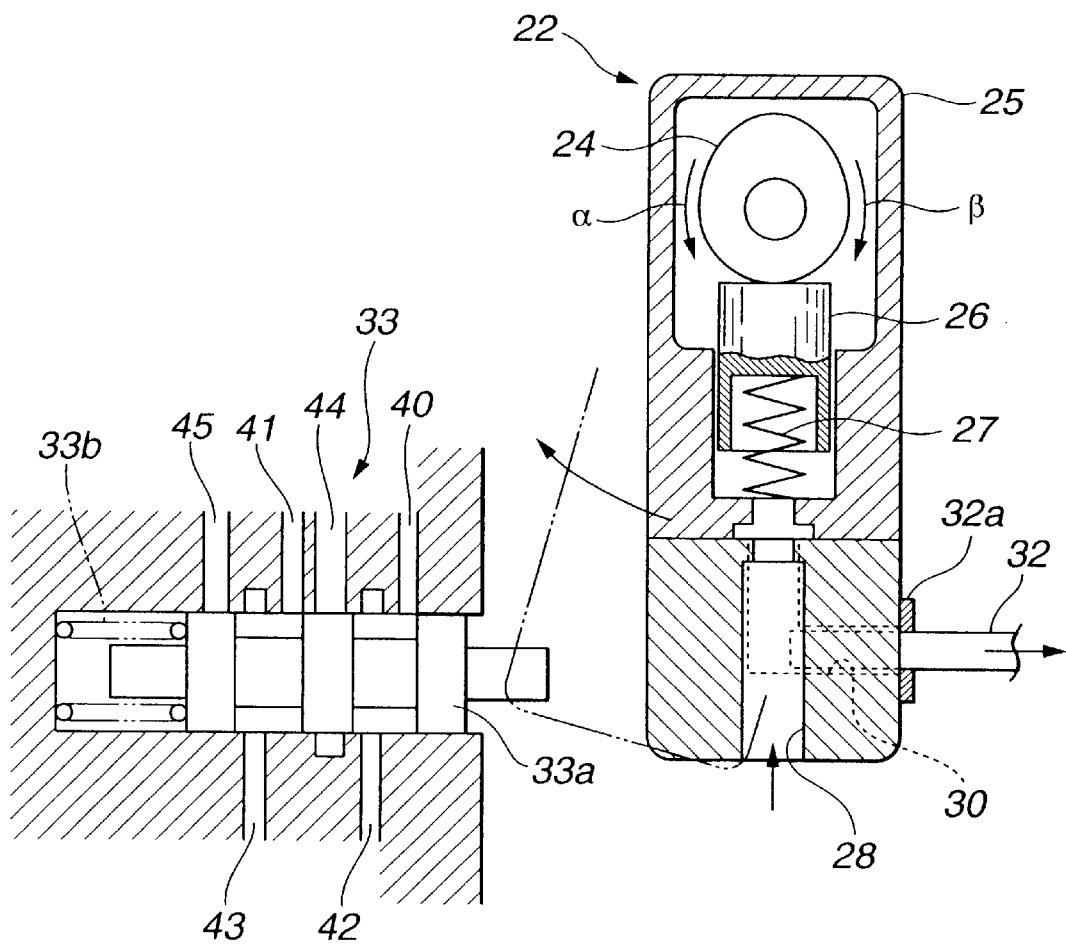
FIG. 3 is an enlarged elevation view illustrating a forward/reverse changeover valve as well as the secondary oil pump, partly cross-sectioned.

For the purpose of the ratio changing control of the toroidal CVT as well as switching control between forward and reverse running modes, as shown in FIG. 1, a primary oil pump 21, which is driven by engine 1, is provided. In the toroidal CVT of the embodiment, a secondary oil pump 22, called "output-rotation driven pump", is provided in addition to primary oil pump 21. A pump shaft of secondary oil pump 22 is fixedly connected to the front end or leftmost end (viewing FIG. 1) of countershaft 15, so that the secondary oil pump is driven in response to input rotation transmitted from the road wheels through transmission output shaft 17 and gearset 16 to countershaft 15. As best seen from FIG. 1, countershaft 15 is permanently coupled to axle driveshafts of the road wheels through gearset 16 and transmission output shaft 17, and therefore secondary oil pump 22 can be driven in response to input rotation transmitted from the road wheels to countershaft 15, while the vehicle is pulled or coasting after engine 1 has been stopped. As shown in FIGS. 2 and 3, secondary oil pump 22 includes an eccentric cam 24 whose input shaft (corresponding to a pump shaft) is fixedly connected to the front end of countershaft 15 by means of a pin 23. Eccentric cam 24 is operatively accommodated within a pump housing 25. As can be appreciated from the two-dotted line indicating the contour of pump housing 25 in FIG. 3, the pump housing is constructed to be freely rotatable about the rotation axis of eccentric cam 24, but not fixed. A radial plunger 26 is slidably disposed in the pump housing. The radial plunger has an inboard end thereof in operative engagement with the cam profile of eccentric cam 24. The inboard end of radial plunger 26 is permanently forced toward the cam profile of eccentric cam 24 by means of a spring 27. Thus, the radial plunger reciprocates in response to rotation of eccentric cam 24. In the shown embodiment, eccentric cam 24 serves as an input motion member, while radial plunger 26 serves as an output motion member. That is, eccentric cam 24 and radial plunger 26 cooperate with each other to provide a motion-transmission system. Reference sign 28 denotes an induction port or inlet port which is bored in pump housing 25 and whose opening end face is leveled lower than a liquid level of oil stored in an oil pan. On the other hand, reference sign 30 denotes a discharge port or outlet port bored in pump housing 25. During reciprocating motion of the radial plunger 26, traction oil or working fluid is inducted from inlet port 28 via an inlet valve 29 such as a lead valve into secondary pump 22, and then pressurized oil is discharged from outlet port 30 via a discharge valve 31 such as a lead valve into a hydraulic discharge circuit 32 (see FIGS. 3 and 4). As can be seen from FIG. 3, the pump housing tends to rotate along with eccentric cam 24 in a direction of rotation of the eccentric cam, owing to a drag force or a frictional force at a contacting portion between eccentric cam 24 and radial plunger 26. Therefore, for a period of time during which eccentric cam 24 is rotated in a direction indicated by the arrow a (a counterclockwise direction in the cross section of FIG. 3) due to forward rotation of the road wheels, pump housing 25 is kept in abutted-engagement with an outer flanged portion 32a integrally formed with a tubular end constructing a part of hydraulic discharge circuit 32, (see a position of the pump housing indicated by the solid line in FIG. 3). In this case, the pressurized working fluid is fed through outlet port 30 and outlet valve 31 into the tubular end of hydraulic discharge circuit 32. In contrast, for a period of time during which eccentric cam 24 is rotated in a direction indicated by the arrow β (a clockwise direction in the cross section of FIG. 3) due to reverse rotation of the road wheels, pump housing 25 is located at a position of the pump housing indicated by the two-dotted line in FIG. 3, while maintaining fluid communication between outlet port 30 and the tubular end of hydraulic discharge circuit 32. With the pump housing kept at the position indicated by the two-dotted line in FIG. 3, the lower end portion of pump housing 25 acts to push a spool 33a of a forward/reverse changeover valve 33 (described later) against a spring bias of a return spring 33b into the spool bore, so as to shift spool 33a from a forward-running mode position (simply, a forward position) to a reverse-running mode position (simply, a reverse position). The forward position of spool 33a corresponds to a spool axial position shown in FIG. 3.

As shown in FIG. 4, hydraulic discharge circuit 32 of secondary oil pump 22 is fluidly connected to the hydraulic circuit for transmission-ratio changing control. The hydraulic circuit for ratio changing control is conventional. Typical details of such a ratio-changing-control hydraulic circuit are set forth, for example, in Japanese Patent Provisional Publication No. P11-94062. As seen from the left-hand side of FIG. 4, the ratio-changing-control hydraulic circuit includes a hydraulic control circuit or a hydraulic modulator 36. Hydraulic control circuit 36 receives the pressurized working fluid generated from primary oil pump 21 and modulates or regulates the hydraulic pressure depending on an operating range selected by the driver via a manual valve (not shown). For instance, when the D range is selected, hydraulic control circuit 36 outputs a D-range pressure $P_D$ via its D-range pressure port (not numbered) into a D-range pressure circuit 34. When the R range is selected, hydraulic control circuit 36 outputs an R-range pressure $P_R$ via its R-range pressure port (not numbered) into an R-range pressure circuit 35. The downstream end of D-range pressure circuit 34 is connected to a forward ratio control valve 37, whereas the downstream end of R-range pressure circuit 35 is connected to a reverse ratio control valve 38. As seen from the right-hand side of FIG. 4, forward/reverse changeover valve 33 is fluidly disposed between the ratio control valve pair (37, 38) and a pair of hydraulic chambers defined on both sides of servo piston 13. Forward ratio control valve 37 includes a spool 37a, and an I-shaped link lever 39 whose central portion is mechanically linked or pin-connected to spool 37a. One end of I-shaped link lever 39 is linked or pin-connected to the front end of a motor driven shaft of a step motor in such a manner as to create a displacement of the one end of I-shaped link lever 39 in an axial direction of the spool. There is a one-to-one correspondence between the displacement and the ratio command signal value (the desired transmission ratio). The other end of I-shaped link lever 39 is linked or pin-connected to a forward precision cam for example via an L-shaped link (not shown) in operative engagement with the cam profile of the forward precision cam. The forward precision cam is linked to the trunnion shaft of trunnion 12 so as to transmit axial motion of the trunnion to I-shaped link lever 39 and to feedback the gyration angle of power roller 8 to the I-shaped link lever. In the forward running mode, for example in the D range, the degree of progress for ratio changing is mechanically fed back to the hydraulic servo mechanism via the forward precision cam. The forward ratio control system operates as follows.

When shifting the one end of I-shaped link lever 39 responsively to the ratio command signal by means of the step motor, the central portion of I-shaped link lever 39 also shifts, and thus spool 37a shifts from an initial spool position shown in FIG. 4 in either of axial directions of the spool based on the ratio command signal. The axial displacement of spool 37a establishes fluid communication between D-range pressure circuit 34 and one of output circuits 40 and 41 (of the forward ratio control valve) connected to forward/reverse changeover valve 33, so as to deliver D-range pressure $P_D$ from D-range pressure circuit 34 via forward ratio control valve 37 to the one output circuit. At the same time, the other output circuit is drained. This causes a differential pressure between the hydraulic pressure in output circuit 40 and the hydraulic pressure in output circuit 41, i.e., a differential pressure between the hydraulic pressure in an output circuit 42 of forward/reverse changeover valve 33 and the hydraulic pressure in an output circuit 43 of forward/reverse changeover valve 33. By way of the pressure differential between the hydraulic pressure from output circuit 42 applied to one side of servo piston 13 and the hydraulic pressure from output circuit 43 applied to the other side of servo piston 13 during the forward running mode, the servo piston shifts from its neutral position, in order to progress or advance ratio-changing operation toward the desired transmission ratio corresponding to the transmission-ratio command signal value. The degree of progress for ratio changing is fed back to the other end of I-shaped link lever 39 via the forward precision cam, to execute a so-called stroke control such that servo piston 13 is returned to its neutral position in response to the degree of progress of the ratio changing operation. When the actual transmission ratio reaches the desired transmission ratio corresponding to the transmission-ratio command signal value during the stroke control, spool 37a becomes returned to the initial spool position (as shown in FIG. 4) at which output circuits 40 and 41 are both closed, thereby maintaining the desired transmission ratio corresponding to the transmission-ratio command signal value.

On the other hand, reverse ratio control valve 38 includes a spool 38a, and an L-shaped link (not shown). One end of the L-shaped link is mechanically linked to spool 38a. The other end of the L-shaped link is in operative engagement with the cam profile of a reverse precision cam. In the reverse running mode (in the R range), the degree of progress for ratio changing is mechanically fed back to the hydraulic servo mechanism via the reverse precision cam. The reverse ratio control system operates as follows.

During the reverse running mode (in the R range), spool 38a is shifted in either of axial directions of the spool based on the ratio command signal via the reverse precision cam so that the actual transmission ratio is brought closer to the desired transmission ratio corresponding to a predetermined fixed transmission-ratio command signal value suitable for the R range. The stroke of spool 38a establishes fluid communication between R-range pressure circuit 35 and one of output circuits 44 and 45 (of the reverse ratio control valve) connected to forward/reverse changeover valve 33, so as to deliver R-range pressure $P_R$ from R-range pressure circuit 35 via reverse ratio control valve 38 to the one output circuit, and simultaneously to drain the hydraulic pressure in the other output circuit. This causes a differential pressure between the hydraulic pressure in output circuit 44 and the hydraulic pressure in output circuit 45, that is, a differential pressure between the hydraulic pressure in output circuit 42 of forward/reverse changeover valve 33 and the hydraulic pressure in output circuit 43 of forward/reverse changeover valve 33. By way of the pressure differential between the hydraulic pressure from output circuit 42 applied to one side of servo piston 13 and the hydraulic pressure from output circuit 43 applied to the other side of servo piston 13, the servo piston shifts from its neutral position, in order to progress or advance ratio-changing operation toward the desired transmission ratio corresponding to the fixed transmission-ratio command signal value suitable to the R range. The degree of progress for ratio changing is fed back to the L-shaped link via the reverse precision cam, to execute the stroke control such that servo piston 13 is returned to its neutral position in response to the degree of progress of the ratio changing operation. When the actual transmission ratio reaches the desired transmission ratio corresponding to the fixed transmission-ratio command signal value suitable to the R range during the stroke control, spool 38a becomes returned to the initial spool position (as shown in FIG. 4) at which output circuits 44 and 45 are both closed, thereby maintaining the desired transmission ratio corresponding to the fixed transmission-ratio command signal value suitable to the R range.

Forward/reverse changeover valve 33 is designed so that spool 33a is permanently biased in its spring-loaded position (in the axially rightward position) by way of the bias of return spring 33b, thereby normally establishing fluid communication between output circuit 42 of forward/reverse changeover valve 33 and output circuit 40 of forward ratio control valve 37 and fluid communication between output circuit 43 of forward/reverse changeover valve 33 and output circuit 41 of forward ratio control valve 37. Therefore, with forward/reverse changeover valve spool 33a kept at the spring-loaded position (the forward position), the ratio changing control suitable for the forward running mode is enabled via forward ratio control valve 37, while the ratio changing control suitable for the reverse running mode is disabled or inhibited. As previously discussed in reference to the cross sections of FIGS. 2 and 3 (see the rotational position of pump housing 25 indicated by the two-dotted line in FIG. 3), in the reverse running mode, spool 33a of forward/reverse changeover valve 33 is pushed into the spool bore against the spring bias, so as to shift the spool from the forward position (the axially rightward position or the axially projected position in FIG. 3) to the reverse position (the axially leftward position or the axially retracted position in FIG. 3). With spool 33a held at the reverse position, fluid communication between output circuit 42 of forward/reverse changeover valve 33 and output circuit 44 of reverse ratio control valve 38 and fluid communication between output circuit 43 of forward/reverse changeover valve 33 and output circuit 45 of reverse ratio control valve 38. That is, holding forward/reverse changeover valve spool 33a at the retracted position (the reverse position), enables the ratio changing control suitable for the reverse running mode via reverse ratio control valve 38, and disables or inhibits the ratio changing control suitable for the forward running mode.

In the toroidal continuously variable transmission of the embodiment, hydraulic discharge circuit 32 is branched at its downstream end into two branched lines. A first branched line of the branched lines of hydraulic discharge circuit 32 is fluidly connected via a check valve 46 to D-range pressure circuit 34. The second branched line is fluidly connected via a check valve 47 to R-range pressure circuit 35. A check valve 48 is also provided in D-range pressure circuit 34 and fluidly disposed between the D-range pressure port of hydraulic control circuit 36 and the connection point between the first branched line of hydraulic discharge circuit 32 and D-range pressure circuit 34. A check valve 49 is also provided in R-range pressure circuit 35 and disposed between the connection point between the second branched line of hydraulic discharge circuit 32 and R-range pressure circuit 35. A relief valve 50 is connected to a portion of hydraulic discharge circuit 32 extending from secondary oil pump 22 to the branch point of the first and second branched lines. In more detail, as clearly shown in FIG. 4, relief valve 50 is substantially cylindrical in shape, and the interior space of relief valve 50 is divided into a pressure chamber facing one side of a relief-valve piston 50a and a return-spring chamber facing the other side of relief-valve spring 50a. A return spring 50b is operatively accommodated in the return-spring chamber. The pressure chamber of relief valve 50 is connected to hydraulic discharge circuit 32. Thus, the axial position of piston 50a is dependent upon both the magnitude of the hydraulic pressure in hydraulic discharge circuit 32 and the spring load of return spring 50b compressed. When the hydraulic pressure in hydraulic discharge circuit 32 exceeds a predetermined threshold pressure level (a set relief-valve pressure) that is determined based on a spring stiffness of spring 50b, piston 50a begins to axially move so as to open a relief port 50c and consequently to drain the working fluid (traction oil) from hydraulic discharge circuit 32. Thus, the hydraulic pressure in hydraulic discharge circuit 32 is maintained at a pressure level less than or equal to the set relief-valve pressure (the maximum pressure level permitted by relief valve 50). In addition to the excessive-pressure relieving function, relief valve 50 serves as a pressure accumulator that absorbs or attenuates changes or fluctuations in pressure of hydraulic oil discharged from secondary oil pump 22.

Details of the ratio-changing operation performed by the toroidal continuously variable transmission of the embodiment are hereunder described.

During the forward running mode in the D range, countershaft 15 drives or rotates eccentric cam 24 of secondary oil pump 22 in the direction indicated by the arrow α (see FIG. 3). As set out above, pump housing 25 is kept in abutted-engagement with outer flanged portion 32a integrally formed with the tubular end constructing a part of hydraulic discharge circuit 32 for a time period during which eccentric cam 24 is rotated in the direction indicated by the arrow α due to forward rotation of the road wheels (see a position of the pump housing indicated by the solid line in FIG. 3). As a result, spool 33a of forward/reverse changeover valve 33 is kept at its forward position (spring-loaded position shown in FIGS. 3 and 4). D-range pressure $P_D$ from D-range pressure circuit 34 is used as an initial pressure so as to perform the forward ratio-changing control by way of forward ratio control valve 37. In contrast to the above, during the reverse running mode (in the R range), countershaft 15 drives or rotates eccentric cam 24 of secondary oil pump 22 in the direction indicated by the arrow β (see FIG. 3). Pump housing 25 is rotated toward the position indicated by the two-dotted line in FIG. 3 for a time period during which eccentric cam 24 is rotated in the direction indicated by the arrow β due to reverse rotation of the road wheels. As a result, spool 33a of forward/reverse changeover valve 33 is kept at its reverse position (retracted position shown in FIGS. 3 and 4). R-range pressure $P_R$ from R-range pressure circuit 35 is used as an initial pressure so as to perform the reverse ratio-changing control by way of reverse ratio control valve 38.

When the engine is in its stopped state, there is no discharge of working fluid from primary oil pump 21 having a driven connection with the engine. In this case, there is no supply of D-range pressure from D-range pressure circuit 34 to forward ratio control valve 37 and also there is no supply of R-range pressure from R-range pressure circuit 35 to reverse ratio control valve 38. Therefore, in the stopped state of the engine, it is impossible to perform the forward ratio-changing control via forward ratio control valve 37 and the reverse ratio-changing control via reverse ratio-changing control via reverse ratio control valve 38, using the pressurized working fluid generated from primary oil pump 21.

There is a possibility that torque flows backwards from road wheels to the output disk of the toroidal CVT owing to hauling or coasting even in the engine stopped state. In such a case, countershaft 15, which is permanently connected to axle driveshafts of the road wheels, drives or rotates eccentric cam 24 of secondary oil pump 22 in the direction indicated by the arrow α (counterclockwise direction in the cross section of FIG. 3) in the presence of forward rotation of the road wheels. Conversely in the presence of reverse rotation of the road wheels, countershaft 15 drives or rotates eccentric cam 24 of secondary oil pump 22 in the direction indicated by the arrow β (clockwise direction in the cross section of FIG. 3). As discussed above, secondary oil pump 22 incorporated in the ratio-changing-control hydraulic circuit of the toroidal CVT of the embodiment is comprised of a radial plunger pump having eccentric cam 24 and radial plunger 26. In other words, the secondary oil pump is a reversible oil pump. Thus, secondary oil pump 22 functions to discharge pressurized working oil into hydraulic discharge circuit 32, when the eccentric cam is rotated in either of the direction indicated by the arrow α and the direction indicated by the arrow β due to torque transmitted from the road wheels to the countershaft. The discharge pressure from secondary oil pump 22 is directed to forward ratio control valve 37 and reverse ratio control valve 38 through the respective check valves 46 and 47, and then directed via forward/reverse changeover valve 33 to servo piston 13 under control via forward ratio control valve 37 and reverse ratio control valve 38. That is, when torque backwardly flows from road wheels to the output disk of the toroidal CVT owing to hauling or coasting in the engine stopped state, the discharge pressure created by secondary oil pump 22 can be used to prevent the previously-noted high-ratio starting, as detailed hereunder.

When the road wheels are rotated due to hauling or coasting in the engine stopped state, trunnion 12 tends to slightly shift in the direction of trunnion axis $O_2$ shown in FIG. 4, thus causing a slight offset of power roller 8 from the neutral position. For instance, when the operating range is set at the D range and trunnion 12 moves in one trunnion-axis direction (an upward direction) indicated by the arrow δ in FIG. 4 due to road-wheel forward rotation (normal rotation) created by hauling or coasting in the engine stopped state, the forward precision cam causes a displacement of the other end (right-hand end) of I-shaped link lever 39 in a direction indicated by the arrow γ, i.e., in a downward direction (viewing FIG. 4). Thus, spool 37a of forward ratio control valve 37 also shifts axially downwards. As a result of this, the discharge pressure from secondary oil pump 22 is introduced through hydraulic discharge circuit 32, check valve 46, forward ratio control valve 37, output circuit 40, and output circuit 42 to the hydraulic chamber defined on the one side (the upper side) of servo piston 13. As a matter of course, the hydraulic pressure in the upper chamber of servo piston 13 becomes higher. At the same time, owing to the downward motion of spool 37a of forward ratio control valve 37, the hydraulic chamber defined on the other side (the lower side) of servo piston 13 is connected through output circuit 43 and output circuit 41 to the drain port. As a result, the hydraulic pressure in the lower chamber of servo piston 13 becomes lower. That is, the hydraulic control system of the toroidal CVT of the embodiment operates to move or shift trunnion 12 in the other trunnion-axis direction (the downward direction) opposing the upward direction indicated by the arrow δ in FIG. 4. At this time, if the trunnion further moves in the trunnion-axis direction opposing the direction indicated by the arrow δ after the trunnion neutral position has been reached, the further motion of the trunnion can be fed back to I-shaped link lever 39 via the forward precision cam, in order to cause displacement of the other end (right-hand end) of I-shaped link lever 39 in the direction opposing the direction indicated by the arrow γ, i.e., in an upward direction (viewing FIG. 4). Thus, spool 37a of forward ratio control valve 37 also shifts axially upwards, and as a result the discharge pressure from secondary oil pump 22 is introduced through hydraulic discharge circuit 32, check valve 46, forward ratio control valve 37, output circuit 41, and output circuit 43 to the lower hydraulic chamber of servo piston 13, thus rising the hydraulic pressure in the lower chamber of servo piston 13. At the same time, owing to the upward motion of spool 37a, the hydraulic pressure in the upper chamber of servo piston 13 falls. As a result of this, the trunnion is returned again to its neutral position. In this manner, the trunnion is brought closer to the neutral position. As discussed above, according to the toroidal CVT having secondary oil pump 22 (driven by torque transmitted from the road wheels to the countershaft) as well as primary oil pump 21 (driven by the engine), even when the road wheels are rotated owing to road-wheel forward rotation created by hauling or coasting in the engine stopped state and torque is transmitted from the road wheels to the countershaft, the trunnion can be controlled to the neutral position by virtue of the discharge pressure from secondary oil pump 22. At the same time, spool 37a can be returned to its initial spool position (spool neutral position), when the actual transmission ratio reaches the desired transmission ratio instructed to the one end (the left end) of I-shaped link lever 39 via the step motor, by virtue of the forward precision cam serving as a mechanical feedback device that is linked between the trunnion shaft and forward-ratio-control-valve spool 37a so as to mechanically reflect the degree of progress for transmission-ratio changing. With spool 37a held at the initial spool position, output circuits 40 and 41, in other words, the upper and lower chambers of servo piston 13 are both closed. Under these conditions, there is no occurrence of the trunnion stroke in either of axial directions of trunnion axis $O_2$ and thus the desired transmission ratio corresponding to the ratio command signal value is maintained. As set forth above, the toroidal CVT of the embodiment can avoid undesired high-ratio starting even when the road wheels are rotated owing to road-wheel forward rotation (normal rotation) created by hauling or coasting in the engine stopped state.

Conversely when the operating range is set at the D range and trunnion 12 moves in the opposite direction (the downward direction) with respect to the trunnion-axis direction indicated by the arrow δ in FIG. 4 due to road-wheel reverse rotation created by hauling or coasting in the engine stopped state, the forward precision cam causes a displacement of the other end (right-hand end) of I-shaped link lever 39 in the opposite direction (the upward direction) with respect to the direction indicated by the arrow γ. Thus, spool 37a of forward ratio control valve 37 also shifts axially upwards. The discharge pressure from secondary oil pump 22 is introduced through hydraulic discharge circuit 32, check valve 46, forward ratio control valve 37, output circuit 41, and output circuit 43 to the hydraulic chamber defined on the other side (the lower side) of servo piston 13. The hydraulic pressure in the lower chamber of servo piston 13 becomes higher. At the same time, owing to the upward motion of spool 37a of forward ratio control valve 37, the hydraulic chamber defined on the one side (the upper side) of servo piston 13 is connected through output circuit 42 and output circuit 40 to the drain port. As a result, the hydraulic pressure in the upper chamber of servo piston 13 becomes lower. That is, the hydraulic control system of the toroidal CVT of the embodiment operates to move or shift trunnion 12 in the one trunnion-axis direction (the upward direction) indicated by the arrow δ in FIG. 4. At this time, when the trunnion further moves in the trunnion-axis direction indicated by the arrow δ after the trunnion neutral position has been reached, the further motion of the trunnion can be fed back to I-shaped link lever 39 via the forward precision cam, in order to cause displacement of the other end (right-hand end) of I-shaped link lever 39 in the direction indicated by the arrow γ, i.e., in the downward direction (viewing FIG. 4). Thus, spool 37a of forward ratio control valve 37 also shifts axially downwards, and as a result the discharge pressure from secondary oil pump 22 is introduced through hydraulic discharge circuit 32, check valve 46, forward ratio control valve 37, output circuit 40, and output circuit 42 to the upper hydraulic chamber of servo piston 13, thus rising the hydraulic pressure in the upper chamber of servo piston 13. At the same time, owing to the downward motion of spool 37a, the hydraulic pressure in the lower chamber of servo piston 13 falls. As a result of this, the trunnion is returned again to its neutral position. In this manner, the trunnion is brought closer to the neutral position. As discussed above, according to the toroidal CVT having secondary oil pump 22 (driven by torque transmitted from the road wheels to the countershaft) as well as primary oil pump 21 (driven by the engine), even when the road wheels are rotated owing to road-wheel reverse rotation created by hauling or coasting in the engine stopped state and torque is transmitted from the road wheels to the countershaft, the trunnion can be controlled to the neutral position by virtue of the discharge pressure from secondary oil pump 22. At the same time, spool 37a can be returned to its initial spool position, when the actual transmission ratio reaches the desired transmission ratio instructed to the one end (the left end) of I-shaped link lever 39 via the step motor, by virtue of the forward precision cam. With spool 37a held at the initial spool position, output circuits 40 and 41, in other words, the upper and lower chambers of servo piston 13 are both closed. Under these conditions, there is no occurrence of the trunnion stroke in either of axial directions of trunnion axis $O_2$ and thus the desired transmission ratio corresponding to the ratio command signal value is maintained. As set forth above, the toroidal CVT of the embodiment can avoid undesired high-ratio starting even when the road wheels are rotated owing to road-wheel reverse rotation created by hauling or coasting in the engine stopped state.

When the operating range is set at the R range and spool 33a of forward/reverse changeover valve 33 is kept at the reverse position (the spool position downwardly shifted from the spring-loaded position shown in FIG. 4) and trunnion 12 moves in the one trunnion-axis direction (the upward direction) indicated by the arrow δ in FIG. 4 due to road-wheel forward rotation created by hauling or coasting in the engine stopped state, the reverse precision cam causes a displacement of spool 38a in a downward direction (viewing FIG. 4). As a result of this, the discharge pressure from secondary oil pump 22 is introduced through hydraulic discharge circuit 32, check valve 47, reverse ratio control valve 38, output circuit 44, and output circuit 42 to the upper hydraulic chamber of servo piston 13. The hydraulic pressure in the upper chamber of servo piston 13 becomes higher. At the same time, owing to the downward motion of spool 38a of reverse ratio control valve 38, the lower chamber of servo piston 13 is connected through output circuit 43 and output circuit 45 to the drain port. As a result, the hydraulic pressure in the lower chamber of servo piston 13 becomes lower. That is, the hydraulic control system of the toroidal CVT of the embodiment operates to move or shift trunnion 12 in the other trunnion-axis direction (the downward direction) opposing the upward direction indicated by the arrow δ in FIG. 4. At this time, if the trunnion further moves in the trunnion-axis direction opposing the direction indicated by the arrow δ after the trunnion neutral position has been reached, the further motion of the trunnion can be fed back to the L-shaped link connected to spool 38a via the reverse precision cam, in order to cause displacement of spool 38a in the upward direction (viewing FIG. 4). As a result the discharge pressure from secondary oil pump 22 is introduced through hydraulic discharge circuit 32, check valve 47, reverse ratio control valve 38, output circuit 45, and output circuit 43 to the lower hydraulic chamber of servo piston 13, thus rising the hydraulic pressure in the lower chamber of servo piston 13. At the same time, owing to the upward motion of spool 38a, the hydraulic pressure in the upper chamber of servo piston 13 falls. The trunnion is thus returned again to its neutral position. In this manner, the trunnion is brought closer to the neutral position. As discussed above, according to the toroidal CVT having secondary oil pump 22 (driven by torque transmitted from the road wheels to the countershaft) as well as primary oil pump 21 (driven by the engine), even when the road wheels are rotated owing to road-wheel forward rotation created by hauling or coasting in the engine stopped state and torque is transmitted from the road wheels to the countershaft, the trunnion can be controlled to the neutral position by virtue of the discharge pressure from secondary oil pump 22. At the same time, spool 38a can be returned to its initial spool position (spool neutral position), when the actual transmission ratio reaches the desired transmission ratio corresponding to the predetermined fixed transmission-ratio command signal value suitable for the R range, by virtue of the reverse precision cam serving as a mechanical feedback device that is linked between the trunnion shaft and reverse-ratio-control-valve spool 38a so as to mechanically reflect the degree of progress for transmission-ratio changing. With spool 38a held at the initial spool position, output circuits 44 and 45, in other words, the upper and lower chambers of servo piston 13 are both closed. Under these conditions, there is no occurrence of the trunnion stroke in either of axial directions of trunnion axis $O_2$ and thus the desired transmission ratio corresponding to the predetermined fixed ratio command signal value is maintained. As set forth above, the toroidal CVT of the embodiment can avoid undesired high-ratio starting even when the road wheels are rotated owing to road-wheel forward rotation created by hauling or coasting in the engine stopped state.

Conversely when the operating range is set at the R range and spool 33a of forward/reverse changeover valve 33 is kept at the reverse position (the spool position downwardly shifted from the spring-loaded position shown in FIG. 4) and trunnion 12 moves in the other trunnion-axis direction (the downward direction) opposing the direction indicated by the arrow δ in FIG. 4 due to road-wheel reverse rotation created by hauling or coasting in the engine stopped state, the reverse precision cam causes a displacement of spool 38a in an upward direction (viewing FIG. 4). As a result of this, the discharge pressure from secondary oil pump 22 is introduced through hydraulic discharge circuit 32, check valve 47, reverse ratio control valve 38, output circuit 45, and output circuit 43 to the lower hydraulic chamber of servo piston 13. The hydraulic pressure in the lower chamber of servo piston 13 becomes higher. At the same time, owing to the upward motion of spool 38a of reverse ratio control valve 38, the upper chamber of servo piston 13 is connected through output circuit 42 and output circuit 44 to the drain port. As a result, the hydraulic pressure in the upper chamber of servo piston 13 becomes lower. That is, the hydraulic control system of the toroidal CVT of the embodiment operates to move or shift trunnion 12 in the upward direction indicated by the arrow δ in FIG. 4. At this time, if the trunnion further moves in the trunnion-axis direction indicated by the arrow δ after the trunnion neutral position has been reached, the further motion of the trunnion can be fed back to the L-shaped link connected to spool 38a via the reverse precision cam, in order to cause displacement of spool 38a in the downward direction (viewing FIG. 4). As a result the discharge pressure from secondary oil pump 22 is introduced through hydraulic discharge circuit 32, check valve 47, reverse ratio control valve 38, output circuit 44, and output circuit 42 to the upper hydraulic chamber of servo piston 13, thus rising the hydraulic pressure in the upper chamber of servo piston 13. At the same time, owing to the downward motion of spool 38a, the hydraulic pressure in the lower chamber of servo piston 13 falls. The trunnion is thus returned again to its neutral position. In this manner, the trunnion is brought closer to the neutral position. As discussed above, according to the toroidal CVT having secondary oil pump 22 as well as primary oil pump 21, even when the road wheels are rotated owing to road-wheel reverse rotation created by hauling or coasting in the engine stopped state and torque is transmitted from the road wheels to the countershaft, the trunnion can be controlled to the neutral position by virtue of the discharge pressure from secondary oil pump 22. At the same time, spool 38a can be returned to its initial spool position, when the actual transmission ratio reaches the desired transmission ratio corresponding to the predetermined fixed transmission-ratio command signal value suitable for the R range, by virtue of the reverse precision cam. With spool 38a held at the initial spool position, output circuits 44 and 45, in other words, the upper and lower chambers of servo piston 13 are both closed. Under these conditions, there is no occurrence of the trunnion stroke in either of axial directions of trunnion axis $O_2$ and thus the desired transmission ratio corresponding to the predetermined fixed ratio command signal value is maintained. As set forth above, the toroidal CVT of the embodiment can avoid undesired high-ratio starting even when the road wheels are rotated owing to road-wheel reverse rotation created by hauling or coasting in the engine stopped state.

As will be appreciated from the above, the toroidal CVT of the embodiment is constructed in such a manner as to deliver the pressurized working fluid from secondary oil pump 22 to the existing forward ratio control valve 37 and the existing reverse ratio control valve 38 responsively to rotation transmitted from the road wheels to the transmission output shaft owing to hauling or coasting during the engine stopped state. This hydraulic layout is simple. Furthermore, check valve 48 is provided in D-range pressure circuit 34 via which the hydraulic pressure from primary oil pump 21 is directed toward forward ratio control valve 37, while check valve 49 is provided in R-range pressure circuit 35 via which the hydraulic pressure from primary oil pump 21 is directed toward reverse ratio control valve 38. Discharge circuit 32 for secondary oil pump 22 is constructed so that the hydraulic pressure from secondary oil pump 22 is supplied to both a portion of the hydraulic circuit extending from check valve 48 to forward ratio control valve 37 and a portion of the hydraulic circuit extending from check valve 49 to reverse ratio control valve 38. This prevents counter-flow of the pressurized working fluid from secondary oil pump 22 to hydraulic control circuit 36 of the primary oil pump side. That is, the hydraulic pressure generated by secondary oil pump 22 is efficiently used, thus down-sizing the secondary oil pump. Moreover, in the hydraulic control system of the toroidal CVT of the embodiment, hydraulic discharge circuit 32 for secondary oil pump 22 is connected to both of D-range pressure circuit 34 via which the D-range pressure created by primary oil pump 21 and hydraulic control circuit 36 is directed to forward ratio control valve 37 and R-range pressure circuit 35 via which the R-range pressure created by primary oil pump 21 and hydraulic control circuit 36 is directed to reverse ratio control valve 38. Check valve 46 is provided in the one branched line of hydraulic discharge circuit 32 for secondary oil pump 22, while check valve 47 is provided in the other branched line of hydraulic discharge circuit 32. Thus, there is no delivery of hydraulic pressure from the primary oil pump side to the secondary oil pump side, thus reducing the load on secondary oil pump 22. Additionally, in the hydraulic control system of the toroidal CVT of the embodiment, relief valve 50 is disposed in hydraulic discharge circuit 32 of secondary oil pump 22 upstream of check valves 46 and 47. Thus, it is possible to avoid an excessive rise in the hydraulic pressure in hydraulic discharge circuit 32 even when the road wheels are driven or rotated at high speeds owing to hauling or coasting. The discharge pressure from secondary oil pump 22 is properly limited by way of relief valve 50, thus effectively reducing the load on secondary oil pump 22. As previously discussed, relief valve 50 also serves as a pressure accumulator for the secondary oil pump. Therefore, it is possible to suppress or reduce fluctuations in the hydraulic pressure in hydraulic discharge circuit 32 even when secondary oil pump 22 is driven at low pump speeds during low-speed rotation of the road wheels. This enhances a control accuracy of the ratio-changing control or the stroke control performed by way of the hydraulic pressure from secondary oil pump 22. Furthermore, the working fluid (traction oil) relieved from relief port 50c of relief valve 50 is delivered via the lubricating oil passage to moving parts of the toroidal CVT that require lubrication, for example, spherical joints and needle bearings of upper and lower links, power rollers, input and output disks, rolling contact surfaces between the power roller and input and output disks, and/or bearing parts rotated at high speeds when the vehicle is pulled in the stopped state of the engine. The working fluid (traction oil) relieved from relief port 50c is effective to avoid a lack of lubrication for the bearing parts rotated when the vehicle is pulled in the stopped state of the engine. Additionally, in the toroidal CVT of the embodiment, switching of the spool position of forward/reverse changeover valve 33 between the forward position and the reverse position is made by utilizing rotary motion of secondary-oil-pump housing 25 that is rotatable by way of a drag force or a frictional force at a contacting portion between radial plunger 26 and eccentric cam 24 fixedly connected to countershaft 15. Hitherto, such a switching operation is performed by way of a reverse sensor as disclosed in Japanese Patent Provisional Publication No. 11-182648. The sensing arm portion of the reverse sensor is mechanically linked to the spool end of the forward/reverse changeover valve to monitor or detect the axial position of the spool. As appreciated, the toroidal CVT of the embodiment eliminates the necessity of the reverse sensor. Secondary oil pump 22 can be located at the installation position of the reverse sensor. It is unnecessary to newly design an installation space for the secondary oil pump 22. This minimizes manufacturing costs of toroidal CVTs. In the shown embodiment, a radial plunger pump (a comparatively expensive reversible pump) is used as secondary oil pump 22. In lieu thereof, a non-reversible oil pump (such as a gear pump or a vane pump) equipped with a directional control valve capable of switching from one of a suction or induction direction and a discharge direction to the other depending upon a direction of rotation of a pump shaft of the non-reversible oil pump may be used as secondary oil pump 22.

As previously described, in order to avoid undesired high-ratio starting, the toroidal CVT of the embodiment includes secondary oil pump 22 that can discharge the pressurized working fluid responsively to input rotation transmitted from the road wheels irrespective of road-wheel forward rotation (normal rotation) and road-wheel reverse rotation occurring in the stopped state of the prime mover (the engine). In lieu thereof, the fundamental concept of the toroidal CVT of the embodiment that uses the secondary oil pump for avoidance of high-ratio starting is combined with a biasing device for example a return spring that biases a trunnion in one trunnion-axis direction, as disclosed in the previously-noted Japanese Patent Provisional Publication No. 2000-9197 (corresponding to U.S. Pat. No. 6,159,126). Concretely, in order to avoid the high-ratio starting created due to input rotation from the road wheels in one rotation direction, the biasing device disclosed in U.S. Pat. No. 6,159,126 is used to prevent an undesired offset of the power roller from its neutral position by biasing the trunnion in one trunnion-axis direction even when the road wheels are rotated in the one rotation direction in the stopped state of the engine. The teachings of U.S. Pat. No. 6,159,126 are hereby incorporated by reference. In order to avoid the high-ratio starting created due to input rotation from the road wheels in the other rotation direction, only when the road wheels are rotated in the other rotation direction, the hydraulic pressure from the secondary oil pump is used and supplied to forward ratio control valve 37 and reverse ratio control valve 38 so as to prevent an undesired offset of the power roller from its neutral position by hydraulically operating the servo piston under control via the forward ratio control valve and the reverse ratio control valve only when the road wheels are rotated in the other rotation direction in the stopped state of the engine. In this case, a non-reversible oil pump that provides a pumping action only when the oil pump is driven in one rotation direction can be used as a secondary oil pump. Such a non-reversible pump is simple in construction and thus inexpensive. This reduces manufacturing costs of toroidal CVTs. Only when the road wheels are rotated in the other rotation direction, the non-reversible oil pump is efficiently used, thus reducing the load on the secondary oil pump and consequently down-sizing the secondary oil pump. This enhances the design flexibility and the freedom in the location or installation of the secondary oil pump.

The entire contents of Japanese Patent Application No. P2001-136858 (filed May 8, 2001) and Japanese Patent Provisional Publication Nos. P11-94062 (published Apr. 9, 1999) and P11-182648 (published Jul. 6, 1999) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A toroidal continuously variable transmission comprising:
   an input disk to which rotation of a prime mover is transmitted;
   an output disk coaxially arranged with and opposed to the input disk, the output disk adapted to have a driving connection with and to have a driven connection with a road wheel;
   a power roller interposed between the input and output disks under axial preload for power transmission;
   a trunnion rotatably supporting the power roller to permit a tilting motion of the power roller about a trunnion axis perpendicular to a rotation axis of the power roller for ratio changing;
   a primary oil pump driven by the prime mover to produce a hydraulic pressure;
   a secondary oil pump driven in response to rotation of the road wheel to produce a hydraulic pressure;
   a hydraulic servo mechanism connected to the trunnion to move the trunnion in a direction of the trunnion axis so as to cause the tilting motion of the power roller by creating an offset of the power roller from a neutral position in the direction of the trunnion axis, the neutral position being a non-ratio-changing position at which the rotation axis of the power roller intersects a rotation axis of the input and output disks;
   a feedback device through which a degree of progress for ratio changing is fed back to the hydraulic servo mechanism so that the power roller returns to the neutral position when a desired transmission ratio has been reached;
   the hydraulic servo mechanism hydraulically operated by at least one of the hydraulic pressure from the primary oil pump and the hydraulic pressure from the secondary oil pump; and
   a hydraulic circuit that supplies the hydraulic pressure from the secondary oil pump to the hydraulic servo mechanism when the road wheel is rotated in a stopped state of the prime mover, so that an actual transmission ratio is brought closer to the desired transmission ratio.

2. The toroidal continuously variable transmission as claimed in claim 1, which further comprises:
   a forward and reverse changeover mechanism that reversibly transmits the rotation of the prime mover to the input disk;
   a pair of forward ratio control valve and reverse ratio control valve cooperating with the feedback device to direct the hydraulic pressure from the primary oil pump to the hydraulic servo mechanism responsively to the degree of progress for ratio changing, so that the actual transmission ratio is brought closer to the desired transmission ratio; and
   a forward/reverse changeover valve switchable between a forward position that supplies the hydraulic pressure from the forward ratio control valve to the hydraulic servo mechanism during transmission of forward rotation via the forward and reverse changeover mechanism and a reverse position that supplies the hydraulic pressure from the reverse ratio control valve to the hydraulic servo mechanism during transmission of reverse rotation via the forward and reverse changeover mechanism;
   wherein the hydraulic circuit supplies the hydraulic pressure from the secondary oil pump to the forward ratio control valve and the reverse ratio control valve when the road wheel is rotated in the stopped state of the prime mover.

3. The toroidal continuously variable transmission as claimed in claim 2, which further comprises:
   a first hydraulic circuit that directs the hydraulic pressure from the primary oil pump to the forward ratio control valve;
   a second hydraulic circuit that directs the hydraulic pressure from the primary oil pump to the reverse ratio control valve;
   a first check valve disposed in the first hydraulic circuit; and
   a second check valve disposed in the second hydraulic circuit;
   wherein the hydraulic pressure from the secondary oil pump is supplied to a portion of the first hydraulic circuit extending from the first check valve to the forward ratio control valve, and the hydraulic pressure from the secondary oil pump is supplied to a portion of the second hydraulic circuit extending from the second check valve to the reverse ratio control valve.

4. The toroidal continuously variable transmission as claimed in claim 2, which further comprises:
   a hydraulic discharge circuit that is branched at a downstream end into two branched lines through which the hydraulic pressure from the secondary oil pump is supplied to the forward ratio control valve and the reverse ratio control valve; and
   a pair of check valves disposed in the respective branched lines of the hydraulic discharge circuit.

5. The toroidal continuously variable transmission as claimed in claim 4, which further comprises:
   a relief valve disposed in the hydraulic discharge circuit upstream of the check valves disposed in the respective branched lines.

6. The toroidal continuously variable transmission as claimed in claim 5, wherein:
   the relief valve has a pressure accumulating function that reduces fluctuations in the hydraulic pressure from the secondary oil pump.

7. The toroidal continuously variable transmission as claimed in claim 4, which further comprises:
   a relief port via which working fluid relieved from the relief valve is introduced into moving parts of the toroidal continuously variable transmission that require lubrication.

8. The toroidal continuously variable transmission as claimed in claim 2, wherein:
   the secondary oil pump comprises:
      (a) an input motion member that is driven in response to rotation of the road wheel;
      (b) a pump housing that is freely rotatable about a pump axis of the input member; and
      (c) an output motion member that is in operative engagement with the input motion member to provide a pumping action during rotation of the input motion member;
   the pump housing being rotated by a frictional force created in a motion-transmission system having at least the input motion member and the output motion member; and
   switching between the forward position and the reverse position of the forward/reverse changeover valve is performed by rotary motion of the pump housing.

9. The toroidal continuously variable transmission as claimed in claim 8, wherein:
   the forward/reverse changeover valve is held at the forward position for a period of time during which the input motion member is rotated in the first rotation direction by the forward rotation of the road wheel; and
   the forward/reverse changeover valve is held at the reverse position for a period of time during which the input motion member is rotated in the second rotation direction by the reverse rotation of the road wheel.

10. The toroidal continuously variable transmission as claimed in claim 2, which further comprises:
    a biasing device that biases the trunnion in a first axial direction of the trunnion axis to prevent the offset of the power roller from the neutral position from being created when the road wheel is rotated in one of the forward direction and the reverse direction in the stopped state of the prime mover; and
    the secondary oil pump comprises a non-reversible pump that supplies the hydraulic pressure to either of the forward ratio control valve and the reverse ratio control valve only when the road wheel is rotated in the other direction.

11. The toroidal continuously variable transmission as claimed in claim 2, wherein:
    the secondary oil pump comprises a reversible pump.

12. The toroidal continuously variable transmission as claimed in claim 2, wherein:
    the secondary oil pump comprises:
       (a) a rotary member that is driven in response to rotation of the road wheel;
       (b) a pump housing that is freely rotatable about a rotation axis of the rotary member; and
       (c) a reciprocating member that is slidably disposed in the pump housing and has an inboard end in operative engagement with the rotary member to cause reciprocating motion of the reciprocating member during rotation of the rotary member;
    the pump housing rotates along with the rotary member in a first rotation direction of the rotary member by a frictional force at a contacting portion between the rotary member and the reciprocating member during forward rotation of the road wheel;
    the pump housing rotates along with the rotary member in a second rotation direction of the rotary member by a frictional force at the contacting portion between the rotary member and the reciprocating member during reverse rotation of the road wheel; and
    switching between the forward position and the reverse position of the forward/reverse changeover valve is performed by rotary motion of the pump housing.

13. The toroidal continuously variable transmission as claimed in claim 12, wherein:
    the rotary member comprises an eccentric cam; and
    the reciprocating member comprises a radial plunger whose inboard end is permanently forced toward a cam profile of the eccentric cam by a spring bias.

14. A toroidal continuously variable transmission comprising:
    an input disk to which rotation of a prime mover is transmitted;
    an output disk coaxially arranged with and opposed to the input disk, the output disk adapted to have a driving connection with and to have a driven connection with a road wheel;

a power roller interposed between the input and output disks under axial preload for power transmission;

a trunnion rotatably supporting the power roller to permit a tilting motion of the power roller about a trunnion axis perpendicular to a rotation axis of the power roller for ratio changing;

primary oil pump means driven by the prime mover for producing a hydraulic pressure;

secondary oil pump means driven in response to rotation of the road wheel for producing a hydraulic pressure;

hydraulic servo means connected to the trunnion for moving the trunnion in a direction of the trunnion axis so as to cause the tilting motion of the power roller by creating an offset of the power roller from a neutral position in the direction of the trunnion axis, the neutral position being a non-ratio-changing position at which the rotation axis of the power roller intersects a rotation axis of the input and output disks;

feedback means for mechanically feeding a degree of progress for ratio changing back to the hydraulic servo means so that the power roller returns to the neutral position when a desired transmission ratio has been reached;

the hydraulic servo means hydraulically operated by at least one of the hydraulic pressure from the primary oil pump means and the hydraulic pressure from the secondary oil pump means; and a hydraulic circuit that supplies the hydraulic pressure from the secondary oil pump means to the hydraulic servo means when the road wheel is rotated in a stopped state of the prime mover, so that an actual transmission ratio is brought closer to the desired transmission ratio.

15. The toroidal continuously variable transmission as claimed in claim 14, which further comprises:

forward and reverse changeover means for reversibly transmitting the rotation of the prime mover to the input disk;

forward ratio control valve means and reverse ratio control valve means cooperating with the feedback means for directing the hydraulic pressure from the primary oil pump means to the hydraulic servo means responsively to the degree of progress for ratio changing, so that the actual transmission ratio is brought closer to the desired transmission ratio; and forward/reverse changeover valve means switchable between a forward position that supplies the hydraulic pressure from the forward ratio control valve means to the hydraulic servo means during transmission of forward rotation via the forward and reverse changeover means and a reverse position that supplies the hydraulic pressure from the reverse ratio control valve means to the hydraulic servo means during transmission of reverse rotation via the forward and reverse changeover means;

wherein the hydraulic circuit supplies the hydraulic pressure from the secondary oil pump means to the forward ratio control valve means and the reverse ratio control valve means when the road wheel is rotated in the stopped state of the prime mover.

16. The toroidal continuously variable transmission as claimed in claim 15, which further comprises:

a hydraulic modulator that receives pressurized working fluid generated from the primary oil pump means and regulates the hydraulic pressure from the primary oil pump means depending on a driver-selected operating range;

a first hydraulic circuit that directs a hydraulic pressure suitable for a drive range from the hydraulic modulator to the forward ratio control valve means when the drive range is selected;

a second hydraulic circuit that directs a hydraulic pressure suitable for a reverse range from the hydraulic modulator to the reverse ratio control valve when the reverse range is selected;

first check valve means disposed in the first hydraulic circuit; and second check valve means disposed in the second hydraulic circuit;

wherein the hydraulic pressure from the secondary oil pump means is supplied to a portion of the first hydraulic circuit extending from the first check valve means to the forward ratio control valve means, and the hydraulic pressure from the secondary oil pump means is supplied to a portion of the second hydraulic circuit extending from the second check valve means to the reverse ratio control valve means, and the first and second check valve means cooperate with each other for preventing counter-flow of the pressurized working fluid from the secondary oil pump means to the hydraulic modulator of the primary oil pump.

17. The toroidal continuously variable transmission as claimed in claim 16, which further comprises:

a hydraulic discharge circuit that is branched at a downstream end into two branched lines through which the hydraulic pressure from the secondary oil pump means is supplied to the forward ratio control valve means and the reverse ratio control valve means; and first and second check valve means disposed in the respective branched lines of the hydraulic discharge circuit for preventing counter-flow of working fluid of the hydraulic pressure suitable for the drive range from the hydraulic modulator to the secondary oil pump and for preventing counter-flow of working fluid of the hydraulic pressure suitable for the reverse range from the hydraulic modulator to the secondary oil pump.

18. The toroidal continuously variable transmission as claimed in claim 17, which further comprises:

relief valve means disposed in the hydraulic discharge circuit upstream of the first and second check valve means disposed in the respective branched lines for avoiding an excessive rise in the hydraulic pressure in the hydraulic discharge circuit.

* * * * *